United States Patent Office 3,734,863
Patented May 22, 1973

3,734,863
HYDROGEN GENERATING COMPOSITIONS
Werner F. Beckert and Ottmar H. Dengel, Oxon Hill, Md., and Rodger W. McKain, Lima, Ohio, assignors to the United States of America as represented by the Secretary of the Navy
No Drawing. Continuation-in-part of abandoned application Ser. No. 872,419, Oct. 29, 1969. This application June 11, 1971, Ser. No. 152,422
Int. Cl. C01b 1/05; C09k 3/02
U.S. Cl. 252—188                12 Claims

ABSTRACT OF THE DISCLOSURE

Solid compositions, stable at ambient temperatures, which generate hydrogen gas when heated to initiate the reaction between the components of the composition.

The compositions comprise certain ammonium salts such as $NH_4Cl$ and complex hydrides such as $LiAlH_4$ and $NaAlH_4$ or certain hydrazine derivates such as $N_2H_6Cl_2$ and complex hydrides such as $NaBH_4$.

CROSS-REFERENCE TO RELATED APPLICATIONS

This application is a continuation-in-part of copending Ser. No. 872,419, filed on Oct. 29, 1969, and now abandoned.

BACKGROUND OF THE INVENTION

This invention relates generally to the art of gas generation and more particularly to compositions and methods for generating hydrogen gas.

There are currently only a limited number of methods available to produce hydrogen on a small scale. For example, hydrogen gas is generated by the reaction of metals or metal hydrides with acids, bases, water, alcohols, etc. Hydrogen gas can also be stored in and released from pressurized gas cylinders. However, these methods are not applicable when severe weight and/or volume restrictions are imposed on a system which must generate relatively small amounts of hydrogen gas (up to about 250 liters) in a short time (less than one minute). The following example will illustrate this point: the reaction $LiH+H_2O \rightarrow LiOH+H_2$ liberates about 27 kcal./mole hydrogen. Assuming 100 percent completion of the reaction without an available external heat sink, then well over 300 grams of water would be needed to produce 1 mole of hydrogen gas (i.e., 18 grams of water as reactant and the remainder for a heat sink) in order to prevent boiling of the water and the formation of a hydrogen/steam mixture. This means that the weight/volume ratio (reactants (grams) per liter of hydrogen generated) is greater than 14 grams per liter.

Another reaction which has been proposed to generate hydrogen is based on the thermal decomposition of hydrazine bisborane. This reaction is represented by the following equation:

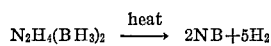

Although in theory this reaction is very favorable in terms of hydrogen produced per gram of reactant (weight-volume ratio is 0.54 gram per liter assuming 100 percent yield), the temperature required to keep the reaction going is high enough to melt glass fiber cloth and the hydrogen produced is at its ignition temperature. In addition, hydrazine bisborane is not commercially available and it is difficult to handle because of its instability.

SUMMARY OF THE INVENTION

Accordingly, it is one object of this invention to provide novel compositions and methods for generating hydrogen gas.

Another object of this invention is to provide compositions and methods for generating hydrogen gas which are particularly applicable where small amounts of gas are required in a very short time.

A further object of this invention is to provide methods for generating hydrogen gas in which the ratio of weight of reactants to volume of gas generated is smaller than heretofore attained.

Still another object of this invention is to provide a method for generating hydrogen gas which is economical and relatively safe.

These and other objects are accomplished by providing solid compositions comprising certain ammonium salts and complex hydrides or certain hydrazine derivatives and complex hydrides which generate hydrogen gas upon heating to initiate the reaction between the components. These compositions and methods of the present invention are particularly useful for space or underwater application or inflation systems for buoyant devices deployed from rockets, aircraft or liferafts.

DESCRIPTION OF THE PREFERRED EMBODIMENTS

The method of this invention is based on a solid state reaction between two or more suitable components. Particularly, the component ingredients employed in the mixtures and methods of the present invention and the reactions by which the desired hydrogen gas is generated are expressed by the following general formulas and general equations:

(I) 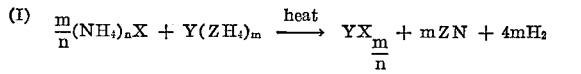

(II) 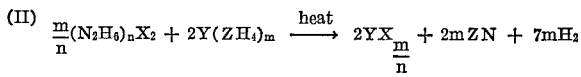

where X is an acid group such as an inorganic acid group like halogen (Cl, Br, F, etc.), sulfate ($SO_4$) and the like, $n$ is the valency of the acid group, Y is a mono- or divalent metal capable of forming complex hydrides such as alkali and alkaline earth metals like Li, Na, K, Mg, Ba, Ca, etc., $m$ is the valency of said metal and Z is a trivalent metal capable of forming complex hydrides such as B, Al, and the like. The compounds employed in the mixtures of this invention are either commercially available or may be prepared by conventional means. The weight/volume ratio (as discussed above) is more favorable in these systems than in any of the hydrogen generating systems employed in the past. For example, 0.83 gram per liter is the weight/volume ratio of the reaction of this invention in which $NH_4F$ and $LiAlH_4$ are employed as hydrogen generating compositions while 1.2 grams per liter is the weight/volume ratio of the method which employs $NH_4Cl$ and $NaAlH_4$ as the respective gas generating composition.

The hydrogen gas generating reactions of this invention are initiated by locally heating the mixture of the component reactants to decomposition temperature. This can be accomplished by any suitable heat source such as a resistance heater fabricated from Nichrome wire for example. Pyrofuse, an electrical squib, a mechanical squib, or the like. In addition, ordinary percussion caps and igniter pills such as $BaCrO_4/Zr$ may be utilized if desired.

A temperature of at least about 150° C. is generally required to initiate the reaction. The component ingredients are generally intimately mixed in stoichiometric amounts according to the aforeidentified general equations. However, it may be desirable to employ an excess of one of the components. For example, one reason why one would want an excess of one of the components is to more efficiently utilize the more expensive components. Furthermore, the use of mixtures of three or more components is also within the scope of the present invention. For example, a mixture of $$a\mathrm{NH_4F} + b\mathrm{NH_4Cl} + c\mathrm{LiAlH_4} + d\mathrm{NaBH_4}$$

or $$\frac{a}{2}\mathrm{N_2H_6Cl_2} + b\mathrm{NH_4F} + c\mathrm{LiAlH_4} + d\mathrm{NaBH_4}$$

where $a+b=c+d$ may be employed as gas generating compositions in the method of the present invention.

These hydrogen generating compositions may be encapsulated or otherwise packaged in such a manner that they may be adapted as a convenient source of predetermined quantities of hydrogen for the inflation of lighter than air balloons or other inflatables, as well as other military and commercial uses. These compositions may be utilized as powders or they may be pressed into pellets to facilitate handling, storage stability and safety characteristics as well as to achieve a more uniform rate of gas evolution after initiation. Coating of one or all of the starting components with a small amount (usually about 0.5–5 weight percent) of a suitable polymer prior to mixing has been found to further improve the handling storage characteristics. Examples of such suitable polymers are polystyrene, polyethylene, polybutadiene, hydroxyvinyl resins, and polycarbonates. Such coating is especially beneficial for components which are sensitive to moisture. Furthermore, micro-encapsulation techniques can be used to increase the temperature stability of certain hydride-ammonium halide combinations. An example will illustrate the aforesaid: the mixture of $\mathrm{NH_4F}$ and $\mathrm{LiBH_4}$ exhibits an exotherm below 30° C. (Ti=62° C.), e.g. this mixture is unstable at ambient temperature. Similar instabilities are encountered in any mixtures which contain the $\mathrm{NH_4F}$—$\mathrm{LiBH_4}$ combination. However, microencapsulation of the $\mathrm{NH_4F}$ prior to mixing with stoichiometric amounts of uncoated $\mathrm{LiBH_4}$, results in a shift of the differential thermal analysis (DTA) exotherm to 40° C., when the $\mathrm{NH_4F}$, which has been microencapsulated with Elvon −30 (a DuPont hydroxyvinyl resin), or similar resins, following generally known microencapsulation techniques, is mixed with said amounts of uncoated $\mathrm{LiBH_4}$. It is also part of the instant invention to optionally use binder or plasticizer to improve handling and/or mechanic stability. Any conventional plasticizer, such as Conco oil (a commercially available mixture of aromatics) may be used so long as it is compatible with the rest of the composition. Similarly, any conventional binder which is compatible with the rest of the composition may be used, such as polystyrene or a styrene-isobutylene copolymer. In addition, any solvent which dissolves the binder, such as conventional hydrocarbon solvents, can be used.

The general nature of the invention having been set forth, the following examples are presented as specific illustrations thereof and also so that the invention be better understood. Furthermore, it will be understood that the invention is not limited to these examples but is susceptible to various modifications that will be recognized by one of ordinary skill in the art. Table I below is a compilation of results attained employing various compositions of the present invention. All the procedures were performed in an inert moisture-free atmosphere. The finely powdered anhydrous components were intimately mixed and the mixture transferred into a heavy wall Pyrex glass reaction vessel equipped with a Nichrome ignition wire. The reaction vessel was connected to a gas measuring system and the reaction initiated by electrically heating the Nichrome wire.

TABLE I.—RATES OF GAS EVOLUTION

| Composition number | Reactants [1] (moles) | Percent yield vs. time (seconds after initiation) | | |
|---|---|---|---|---|
| | | 10 sec. | 20 sec. | 30 sec. |
| 1 | NH₄F(0.1), LiBH₄(0.1) | 10 | 55 | 71 |
| 2 | NH₄Cl(0.1), LiBH₄(0.1) | 10 | 15 | 20 |
| 3 | NH₄F(0.1), NaBH₄(0.1) | 15 | 40 | 60 |
| 4 | NH₄F(0.05), LiBH₄(0.1), NH₄Cl(0.05) | 15 | 40 | 60 |
| 5 | NH₄F(0.1), LiBH₄(0.05), NaBH₄(0.05) | 20 | 55 | 73 |
| 6 | NH₄F(0.1), LiBH₄(0.033), NaBH₄(0.017), LiAlH₄(0.05) | 55 | 90 | 91 |
| 7 | N₂H₆Cl₂(0.05), LiBH₄(0.1) | 5 | 15 | 28 |

[1] Used as powder except for composition 6 which were pressed into pellets.

At present, the mechanism of the reaction of this invention is not fully understood. It is hypothesized, however, that the reaction proceeds via the unstable intermediate $\mathrm{NH_4ZH_4}$ where Z has the aforeidentified significance. For example, a typical reaction may proceed as follows:

$$\mathrm{NH_4Cl} + \mathrm{LiAlH_4} \rightarrow \mathrm{LiCl} + [\mathrm{NH_4AlH_4}] \rightarrow \mathrm{LiCl} + \mathrm{AlN} + 4\mathrm{H_2}$$

A similar typical reaction for the corresponding hydrazine derivative component may proceed as follows:

$$\mathrm{N_2H_6Cl_2} + 2\mathrm{LiBH_4} \rightarrow [\mathrm{BH_4 \cdot NH_3 \cdot NH_3 \cdot BH_4}] + 2\mathrm{LiCl} \rightarrow 2\mathrm{BN} + 7\mathrm{H_2} + 2\mathrm{LiCl}$$

As will be evident to those skilled in the art, various modifications can be made in light of the foregoing disclosure without departing from the scope and spirit thereof.

What is claimed and desired to be secured by Letters Patent of the United States is:

1. A composition capable of generating hydrogen gas comprising the intimate mixture in the solid state of at least one compound having the general formula $(\mathrm{NH_4})_n\mathrm{X}$ wherein X is an inorganic acid group and $n$ is the valency of said inorganic acid group and at least one compound having the general formula $\mathrm{Y(ZH_4)_m}$ wherein Y is a mono- or divalent metal capable of forming complex hydrides and is selected from the group consisting of alkali metals and alkaline earth metals, $m$ is the valency of said mono- or divalent metal and Z is a trivalent metal capable of forming complex hydrides and is selected from the group consisting of boron and aluminum wherein said compounds are present in about stoichiometric amounts or are present in amounts such that there is a stoichiometric excess of one of the components.

2. A composition according to claim 1 wherein said compounds are present in stoichiometric amounts.

3. A composition according to claim 1 wherein said compounds are present in amounts such that there is a stoichiometric excess of one of the components.

4. The composition of claim 1 wherein said acid group is selected from the group consisting of halogen and sulfate.

5. A composition according to claim 4 wherein the mixture comprises at least one compound selected from the group consisting of $\mathrm{NH_4F}$ and $\mathrm{NH_4Cl}$ in combination with at least one compound selected from the group consisting of $\mathrm{LiAlH_4}$, $\mathrm{NaAlH_4}$, $\mathrm{NaBH_4}$ and $\mathrm{LiBH_4}$.

6. A composition according to claim 5 comprising a mixture of $\mathrm{NH_4F}$ and $\mathrm{LiAlH_4}$.

7. A composition according to claim 5 comprising a mixture of $NH_4Cl$ and $NaAlH_4$.

8. A composition according to claim 5 comprising $NH_4F$ and $NaBH_4$.

9. A composition according to claim 5 comprising $NH_4Cl$ and $LiBH_4$.

10. A composition according to claim 5 comprising $NH_4Cl$ and $LiAlH_4$.

11. A composition according to claim 5 comprising a mixture of $NH_4F$, $NH_4Cl$, $LiAlH_4$ and $NaBH_4$.

12. The composition of claim 1 wherein at least one component of the mixture is coated with a polymer selected from the group consisting of polystyrene, polyethylene, polybutadiene, polycarbonate and hydroxyvinyl resins.

References Cited

UNITED STATES PATENTS

| | | | |
|---|---|---|---|
| 3,405,068 | 10/1968 | Hiltz | 252—182 |
| 3,450,638 | 6/1969 | Edwards | 252—188 |

MAYER WEINBLATT, Primary Examiner

I. GLUCK, Assistant Examiner

U.S. Cl. X.R.

252—188.3 R; 423—646, 647, 648